Figure 1:
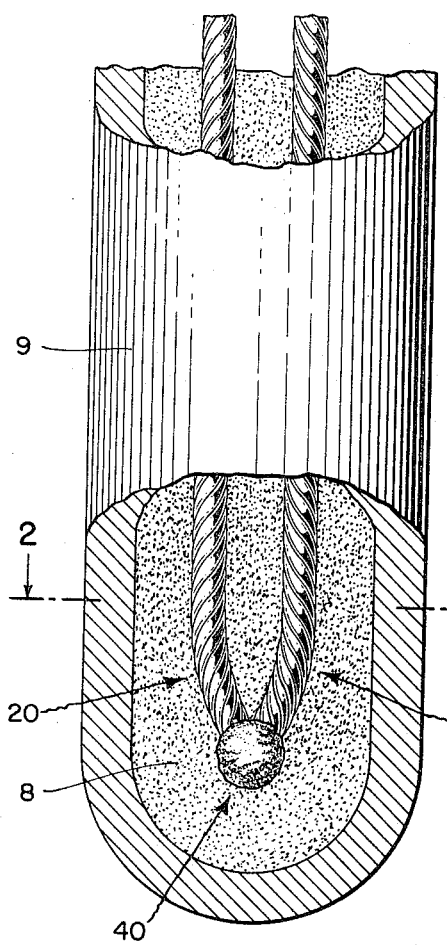

May 2, 1967  C. R. BINGHAM  3,317,353

THERMOCOUPLE COMPRISING INTIMATELY TWISTED WIRES

Filed Dec. 6, 1962

INVENTOR.
CLIFFORD R. BINGHAM
BY Arthur H. Swanson
ATTORNEY.

United States Patent Office 3,317,353
Patented May 2, 1967

3,317,353
THERMOCOUPLE COMPRISING INTIMATELY TWISTED WIRES
Clifford R. Bingham, Flourtown, Pa., assignor to Honeywell Inc., a corporation of Delaware
Filed Dec. 6, 1962, Ser. No. 242,725
2 Claims. (Cl. 136—233)

A known type of thermocouple comprises a pair of solid wires each of a metallic material different from the other. Any pair of dissimilar metals or alloys may be used, provided they give an appreciable voltage when joined together at one end and heated, while the other end remains relatively cool. These wires are protected from the surrounding environment by means of an outer tube of relatively hard metal which surrounds the hot junction formed of the two wires and the ends of the wires adjacent thereto. Mineral oxide insulation is filled into the outer tube between the thermocouple wires forming the leads to the hot junction and around the hot junction itself. This insulation insulates the thermocouple wires from each other, except at the hot junction, and insulates the thermocouple wires and the hot junction from the outer tube. These thermocouples are generally used in areas where high temperatures are present. The thermal coefficient expansion of the wires is usually different from that of the outer tube. Therefore, it is possible to place a stress on the wires because of this differential expansion. Breakage of the wires can result if the differential expansion is too great.

It is an object of this invention to avoid the breakage of the wires due to the differential expansion between the outer tube and the wires or, in other words, to provide relief for the stresses developed in the wires when the thermocouple is heated. This is done by forming the thermocouple wires of a number of strands instead of the solid wires heretofore used. By stranding smaller wires to form individual conductors, a longitudinal flexibility is allowed, especially on those strands not bound by the crystals of the oxide insulation.

Another object of this invention is to provide thermocouple wires having the desired thermal electromotive force (hereinafter abbreviated E.M.F.). By forming the thermocouple wire of a number of strands it becomes possible to make a number of wires each having the same thermal E.M.F. although each strand of the wire does not have the desired thermal E.M.F. Since the wire is formed of a number of strands, the thermal E.M.F. of the wire will be the average of the thermal E.M.F. of the individual strands so that each wire can be made to the desired value.

This invention relates to temperature sensors adapted for use in the most advanced scientific projects of our time such as atomic energy reactors or interplanetary vehicles.

Such a sensor is a very precise and practical thermocouple consisting of wires of different metallic materials encircled by a corrosion-resistance metal sheath and insulated from each other and from the sheath by a solidly compacted mineral oxide insulation. Such thermocouples have a high speed of response, simplicity of construction, and long and useful life. These thermocouples may be of small diameter, (one-sixteenth of an inch or less) and can be supplied in lengths up to fifty feet.

One great advantage of such sensors is their flexibility in that they can be bent on the job to measure in spots which the bulkier and rigidly mounted sensors cannot reach.

One difficulty which has been experienced with such sensors is that the thermocouple wires lack ductility at the high temperatures involved (3,000 degrees Fahrenheit). The coefficient of expansion of the sheath is considerably greater than that of the wires. The wires are firmly compacted within the sheath so that relative motion therebetween is prevented. The result has been that, when the refractory metal wires, such as rhenium or tungsten alloys containing rhenium are embedded in metallic oxide insulation in a stainless steel sheath, the wires break when the sensor is exposed to heat.

It is an object of this invention to avoid this breakage of the thermocouple wires by forming the thermocouple wires of a number of strands instead of the solid wires heretofore used. This avoids the breakage of the wires due to the differential expansion between the outer tube or sheath and the wires or, in other words, provides relief for the stresses developed in the wires when the thermocouple is heated. By stranding the wires to form individual conductors, a longitudinal flexibility is allowed, especially on those strands not bound by the crystals of the oxide insulation.

Figure 3:
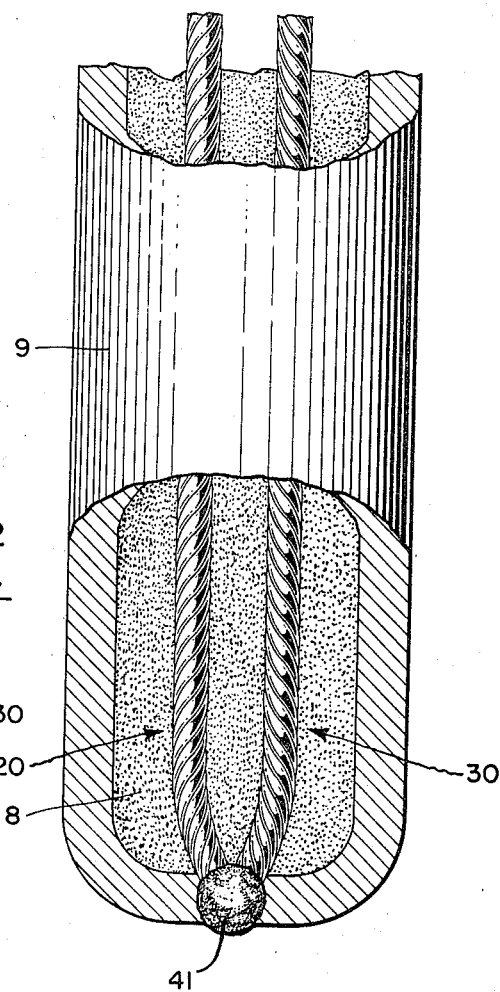
Figure 2:
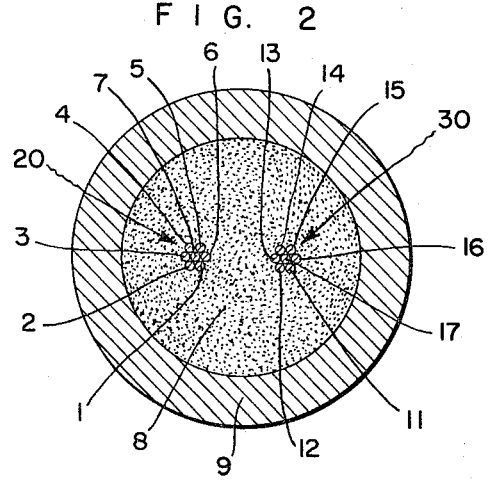

A better understanding of the present invention may be had from the following detailed description when read in connection with the accompanying drawings, in which:

FIG. 1 is a longitudinal cross section;
FIG. 2 is a transverse cross section on line 2—2 of FIG. 1 as viewed in the direction of the arrows; and
FIG. 3 is a longitudinal cross section of a modification.

The temperature sensor of this invention comprises a thermocouple or lead conductor therefor made up of two wires 20 and 30. One of these wires may be of tungsten alloy with five (5) percent rhenium. The other of these wires may be of tungsten alloy with twenty-six (26) percent rhenium. Each of these wires is composed of a number of strands. As shown in FIG. 2, the wire 20 is composed of seven strands marked 1, 2, 3, 4, 5, 6, and 7 in the drawing. These strands are twisted about each other to form a braid and finally wound in a plurality of turns so that the strands 1–7 constitute the wire 20.

Wire 30 is likewise composed of seven strands 10, 11, 12, 13, 14, 15, 16, and 17.

The wires 20 and 30 may be joined together at one end by being soldered, welded and/or otherwise united into a hot junction. Such a hot junction is indicated by the reference character 40 in FIG. 1.

Surrounding the wires 20 and 30 and the hot junction 40 is a layer of mineral oxide insulation 8. This insulation may be one of several pure mineral oxides such as magnesia (MgO).

Surrounding the hot junction 40 and the ends of the wires 20 and 30 adjacent thereto and the layers of insulation 8 is an outer tube or sheath 9. Tube 9 may be of stainless steel or of a metallic alloy such as that sold under the trademark "Inconel," by the International Nickel Company.

The coefficient of expansion of the outer tube or shealth 9 is much greater than that of the wires 20 and 30. The wires 20 and 30 are not under tension within the outer tube or sheath 9 but are slightly bent or twisted so as to provide a greater length of wire 20 and/or 30 than is necessary to extend axially of the tube or sheath 9. Because of this extra length of the wires 20 and 30 and due to the composition of the wires of a number of strands, when the temperature sensor is heated, the outer tube or sheath 9 expands more than do the wires 20 and 30. This expansion does not break the wires 20 and 30 because they have sufficient flexibility or stretch in their lengthwise direction to expand in length sufficiently to avoid being placed under stress and thereby broken.

FIG. 3 shows a modified form of a temperature sensor comprising two wires 20 and 30 which may be joined together at one end to form a hot junction 41 which is connected to the outer tube or sheath 9.

The temperature sensor of this invention may be made as follows. The outer tube or sheath is thoroughly degreased and dried and the interior of the tube is thoroughly sand blasted using clean, dry abrasive. The tubes or sheaths are then thoroughly checked for cracks or pin holes by means of a dye penetrant test. The positive and negative thermocouple wires 20 and 30 are cleaned and freed from kinks. The insulation 8 is applied to the wires 20 and 30 in the form of blocks each about one inch long having two holes therethrough. These insulators are strung on the wires by passing the wires through the holes in the insulators so that the insulators are strung together as tightly as possible without breaking or chipping them.

The insulated wire assemblies are placed in clean retorts as soon as they are finished. A positive flow of clean, dry nitrogen is forced through the retort. The retorts are then placed in a furnace and held at an elevated temperature (such as 1000 degrees C.) for a suitable period of time (such as one-half an hour). Nitrogen is passed through the retorts during this heating step.

Immediately after this heating or firing step, the insulated wire assemblies are drawn into the outer tubes or sheaths. This is done by drawing the each insulated wire assembly into an outer tube or sheath taking care not to break or chip the insulators. Each tube or sheath together with the insulation of the wires in it is then swaged into a smaller diameter. The assembly is then drawn through a die to produce the outer finished required diameter. This should be a one pass operation. The open ends of the outer tube or sheath are then closed by being sealed with silicone varnish such as that sold by the Dow Corning Company under their number 2103.

The so finished temperature sensing devices are then tagged and prepared for shipment.

What is claimed is:

1. A thermocouple including, a negative wire composed of a number of strands intimately twisted to form a braid, a positive wire composed of a number of strands intimately twisted to form a braid, one of the ends of each of said wires being in electrical contact with each other to form a hot junction, a layer of mineral oxide insulating said wires from each other and an outer sheath of a metallic composition having a thermal expansion coefficient substantially greater than that of said wires and surrounding said wires and said hot junction and insulated from said wires by said mineral oxide, and the hot junction being integral with the base of the sheath.

2. A thermocouple including, two wires each having a number of strands intimately twisted about each other to form a braid and finally wound in a plurality of turns in substantial contact with each other, said wires each having a different metallic composition and being united at one of the ends to form a hot junction, an outer sheath having a coefficient of expansion substantially greater than that of either of said wires and surrounding said wires and said hot junction and the hot junction being integral with the base of the sheath, said hot junction being integral with the base of said sheath, and a layer of insulation material insulating each of said wires and said sheath from one another.

References Cited by the Examiner

UNITED STATES PATENTS

| | | | |
|---|---|---|---|
| 2,665,322 | 1/1954 | MacDonald | 136—201 X |
| 2,735,882 | 2/1956 | Farley | 136—229 X |
| 2,800,524 | 7/1957 | Van Lear | 174—118 X |
| 2,856,341 | 10/1958 | Kanne | 136—202 X |
| 3,012,306 | 12/1961 | Tindell | 136—242 X |
| 3,049,577 | 8/1962 | Hill | 136—200 X |

FOREIGN PATENTS 154,454   12/1920   Great Britain.

WINSTON A. DOUGLAS, *Primary Examiner.*

A. M. BEKELMAN, *Assistant Examiner.*